United States Patent Office 3,320,266
Patented May 16, 1967

3,320,266
SULFATO BETAINES AND A METHOD FOR
THEIR PREPARATION
Donald L. Klass, Barrington, Ill., assignor, by mesne assignments, to Union Oil Company of California, Los Angeles, Calif., a corporation of California
No Drawing. Filed Jan. 10, 1964, Ser. No. 336,879
18 Claims. (Cl. 260—294.8)

This invention relates to certain novel organic compounds having the structure of an inner salt or a zwitterion, and to methods of preparing said compounds. This application is a continuation-in-part of copending application Ser. No. 144,034, filed Oct. 10, 1961, now Patent No. 3,225,073.

Betaines, which are also known as inner salts or zwitterions, are known in the prior art. In the past, compounds of this type have been prepared only by relatively complex multi-step processes. As for example, Baker and Field, J. Chem. Soc., 86 (1932), report the preparation of 1-sulfato-1-pyridinium betaine by (1) bromination of formaldehyde to produce bromoform, (2) reduction of bromoform to methylene dibromide, (3) treatment of the methylene dibromide with silver sulfate to yield a cyclic methylene sulfate dimer, and (4) treatment of the methylene sulfate with pyridine.

In copending application Ser. No. 46,362, filed Aug. 1, 1960, of D. L. Klass and V. Brozowski, there is described novel betaines derived from tertiary amines and methods of preparing said betaines which include (1) reacting a tertiary amine-sulfur trioxide complex with an oxirane, (2) reacting a tertiary amine with a cyclic sulfate ester, and (3) sequentially reacting an oxirane with a sulfonating agent and reacting the sulfonated product with a tertiary amine.

One of the objects of this invention is to provide a new class of betaines (also known as inner salts or zwitterions).

Another object of this invention is to provide a method of preparing novel organic compounds having the structure of a betaine.

Still another object of this invention is to provide an improved method for the preparation of quaternary amine-sulfato betaines from aldehydes.

These and other objects of this invention will become apparent as the description thereof herein proceeds.

This invention is based on sulfato-betaine-type compounds and novel methods for producing the same, which betaines may be represented by the following general formula:

$$A\overset{+}{\underset{R'}{\overset{H}{-}C}}-OSO_3^{\ominus}$$

wherein A is a tertiary amine and R' is hydrogen or the radical

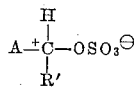

and $R^5$ to $R^7$ represent radicals such as unsubstituted hydrocarbyl radicals, substituted hydrocarbyl radicals having inert substituents, and inert non-hydrocarbyl radicals.

In accordance with this invention, a novel class of betaines is prepared by the reaction of at least one aldehyde group with a tertiary amine-sulfur trioxide complex. The aldehydes with which the tertiary amine-sulfur trioxide complexes are reacted include formaldehyde and those represented by the formula:

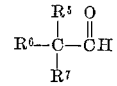

wherein $R^5$, $R^6$ and $R^7$ are the same or different radicals of the group consisting of hydrogen and unsubstituted $C_1$–$C_{30}$ alkyl, aryl, aralkyl, alkaryl, cycloalkyl, alkoxy, thioalkoxy and acetoxy radicals, including cycloalkyl radicals formed by joining two of the R's with an alkylene radical. $R^5$, $R^6$ and $R^7$ as hereinbefore defined may contain substituents which are inert under the reaction conditions, i.e., substituents which are unreactive with the tertiary amine-sulfur trioxide complexes under reaction conditions, such as halo, nitro, mercapto, sulfo and carboxy groups, and at least one of the R's may be a radical or element of the group consisting of halo, nitro, mercapto, sulfur and carboxy groups. Aldehydes in which the aldehyde group is bonded to a carbon atom in an aromatic ring, e.g., benzaldehyde, are inoperative in the method of this invention.

Specific examples of aldehydes coming within the foregoing definition include acetaldehyde, propionaldehyde, n-butyraldehyde, isobutyraldehyde, n-valeraldehyde, isovaleraldehyde, methylethylacetaldehyde, trimethylacetaldehyde, n-hexaldehyde, methyl-n-propylacetaldehyde, dimethylethylacetaldehyde, t-butylacetaldehyde, methylisopropylacetaldehyde, 5-methylhexanal, ethylisopropylacetaldehyde, cyclohexanealdehyde, n-octaldehyde, ethyl-n-butylacetaldehyde, cyclohexylacetaldehyde, nonanal(pelargonic aldehyde), 7-methyloctanal, decanal, undecanal, dodecanal (lauric aldehyde), tetradecanal (myristaldehyde), octadecanal (stearaldehyde), phenylacetaldehyde, α-phenylpropionaldehyde, 3-phenyl-2-methylpropanal, 2-(α-naphthyl)-propionaldehyde, diphenylacetaldehyde, α,β-diphenylpropionaldehyde, trifluoroacetaldehyde, tribromoacetaldehyde (bromal), β-chloropropionaldehyde, 2,3-dibromo-2-methylbutanal, 9-chlorononaldehyde and polyaldehydes, such as succinic dialdehyde. Also coming within the scope of this invention are compounds which yield aldehydes under the reaction conditions, such as paraformaldehyde, paracetaldehyde (paraldehyde), and para n-butyraldehyde.

The tertiary amines which are complexed with sulfur trioxide to form the tertiary amine-sulfur trioxide reactants may be either trihydrocarbyl-substituted amines or heterocyclic tertiary amines. Preferably, the tertiary amines have a pKa value in water of at least about 5.00 (−log K of below about 9.00). For example, a complex of sulfur trioxide with a trihydrocarbyl-substituted tertiary amine of the formula $R^2R^3R^4N$ is reacted with an aldehyde, as hereinbefore defined, to yield 1-sulfato-1-tertiary amine betaines as represented by the equation:

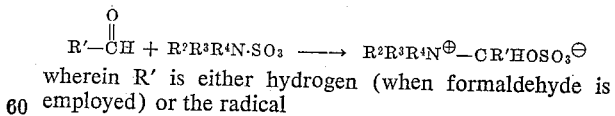

wherein R' is either hydrogen (when formaldehyde is employed) or the radical

with $R^5$, $R^6$ and $R^7$ being as previously defined with respect to the aldehydes, and $R^2$, $R^3$ and $R^4$ are the same or different radicals, preferably $C_1$–$C_{30}$ hydrocarbon radicals, of the group consisting of alkyl, cycloalkyl, aryl, aralkyl and alkaryl radicals. Non-limiting examples of such trihydrocarbyl-substituted amines are trimethylamine, triethylamine, tripropylamine, triisopropylamine, tributylamine, trisecondary butylamine, tritertiary butylamine, tripentylamine, trioctylamine, tridecylamine, trioctadecylamine, tricyclohexylamine, tricyclopentylamine, triphenylamine, tritolylamine, trinaphthylamine, N,N-diethylmethylamine, N,N-dimethylbutylamine, N-ethyldipropylamine, N-butyldiethylamine, N,N-diethylpropylamine, N-propyldiethylamine, N,N-diethylisopropylamine, N-methyldiphenylamine, N,N-diethylbenzylamine, N-benzyldiphenylamine, N-benzyldimethylamine, N,N-dimethylphenethylamine, N,N-diethylaniline, N,N-dimethyl-α-naphthylamine, N,N-dimethyl-α-naphthylamine, and N-methyldiphenylamine.

The betaines which are produced by the reaction of the defined aldehydes with a complex of sulfur trioxide with a heterocyclic tertiary amine may be represented by the general formula:

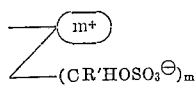

wherein Z represents the heterocyclic tertiary amine having $m$ number of tertiary nitrogen atoms, $m$ is an integer from 1 to 100,000, and R' is as previously defined.

More specifically, heterocyclic tertiary amines which may be utilized to prepare the sulfur trioxide complex reactant include monocyclic heterocyclic tertiary amines and polyheterocyclic tertiary amines of either fused or separated ring structure. Such heterocyclic tertiary amines which are especially prefered include heterocyclic aromatic tertiary amines having one tertiary nitrogen atom per aromatic ring as the only hereto atom, i.e., monocyclic or polycyclic aromatic compounds having only one tertiary nitrogen atom substituted for a ≡C—H group in an aromatic ring, e.g., pyridine, quinoline, isoquinoline and acridine, and polyheterocyclic compounds of a fused aromatic ring structure having only one tertiary nitrogen atom substituted for a ≡C—H group in each of at least two aromatic rings, e.g., o-phenanthroline, pyrido(2,3-g) quinoline, pyrido (3,4-b) pyridine, pyrido (2,3-b) pyridine, and naphthyridine.

The heterocyclic tertiary amines may have substituents which are inert under the reaction conditions, e.g., substituents which are unreactive with sulfur trioxide or aldehydes, such as nitro, halo, carboxyl, and hydrocarbon radicals free of conjugated olefinic and acetylenic unsaturation, e.g., $C_1$–$C_{30}$, alkyl, aryl, cycloalkyl, arylalkyl and alkaryl radicals. Non-limiting examples of substituted derivatives of heterocyclic tertiary amines which may be used in the preparation of the complexes include picoline, lutidine, 2,3,6-collidine, 2-benzylpyridine, 2-isopropylpyridine, 4-methyl-acridine, quinaldine, 2-methyl pyridine, 2,6-dimethylpyridine, nicotinic acid, nicotinic amide, quinolinic acid, and 3-cyclohexylpyridine.

Other preferred heterocyclic aromatic tertiary amines which may be used to form the sulfur trioxide complex that is reacted with an aldehyde, as hereinbefore described, to prepare betaines of the general formula:

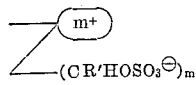

are polyheterocyclic aromatic tertiary amines of separated ring structure. The betaines which are prepared by utilizing polyheterocyclic aromatic tertiary amines are more clearly represented by the formula:

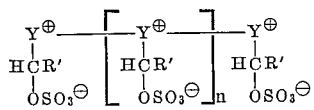

wherein the radicals represented by Y are the same or different radicals (either monocyclic or polycyclic) which have only one hetero tertiary nitrogen atom and are derived from the heterocyclic aromatic tertiary amines hereinbefore characterized, $n$ is an integer from 0 to 100,000, and R' is as previously defined. In comparing the general formula with the more specific formula, it will be noted that the radical Z in the general formula is comprised of the radicals Y in the more specific formula, and the radicals Y have a total of $m$ number of tertiary nitrogen atoms. Non-limiting examples of these polyheterocyclic aromatic tertiary amines are 2,2'-dipyridyl, 2-(2'-pyridyl) quinoline, 2,4'-dipyridyl, 2,6'-4',4''-tripyridyl, 4,4'-diquinolyl, and 2,6'-3',3''-tripyridyl.

Heterocyclic compounds having more than one tertiary amine in the same ring or hetero atoms other than tertiary nitrogen atoms, whether or not of aromatic structure, may also be used. Illustrative of other such heterocyclic tertiary amines which may be used are 1,3-diazine, 1,4-diazine, 1,3,5-triazine, 1,2,4-triazine, 1,3,2-oxazine, 1,2,6-oxazine, 1,2,5-oxathiazine, 3-pseudoindole, 4-pyrindine, 1,4,2-benzoxazine, and n-methylmorpholine.

The tertiary amine-sulfur trioxide complexes are reacted with the aldehyde by mixing and heating, when necessary, to effect reaction. It is generally preferred to carry the reaction out in an inert solvent or inert liquid reaction medium, but the use of such a reaction medium is not absolutely essential. The solvents or reaction media which may be used include hydrocarbons such as benzene, toluene, hexane, pentane, cleaning naphthas, kerosine, chlorinated hydrocarbons such as ethylene dichloride, carbon tetrachloride, etc., and other non-aqueous liquids which are not attacked by the sulfur trioxide-tertiary amine complexes. When a mutual solvent is used in carrying out the reaction, the reactants are dissolved or slurried in the solvent and mixed, and the reaction is allowed to proceed at any suitable temperature in the range from room temperature or below up to the reflux temperature of the solution. In most cases, it is desirable (although not absolutely necessary) to reflux the solution to insure completion of the reaction within a reasonably short period of time.

This novel class of betaines may also be prepared by the treatment of an aldehyde, as hereinbefore defined, with a sulfur trioxide treating reagent to form an aldehyde-sulfur trioxide reaction product which is then reacted with a tertiary amine coming within the previously defined class, viz., either a trihydrocarbyl-substituted tertiary amine or a heterocyclic tertiary amine. The sulfur trioxide-dioxane complex is preferred as the sulfonating or sulfur trioxide treating reagent, but other sulfur trioxide addition products may also be used, as for example, complexes such as dioxane-bis sulfur trioxide, thioxane-sulfur trioxide, dimethyl formamide-sulfur trioxide, etc. The same general reaction conditions hereinbefore outlined are also applicable to the preparation of the betaines in accordance with this alternative method.

The compounds which are produced as hereinbefore described are soluble in water and in a variety of organic solvents. Some of these compounds have surfactant properties and may be used in applications for the reduction of surface tension of water, or of an organic liquid. Compounds which have a long aliphatic chain attached to the nitrogen atom have detergent properties as well as surfactive properties and may be utilized as detergents in the manner well-known to those skilled in the art. These compounds also are useful in aqueous solutions as insecticides to kill parasitic insects. These compounds have germicidal properties, have chemical structures similar to compounds known to have physiological activity, and are thus potentially useful as intermediates in the preparation of physiologically active compounds.

The following non-limiting examples are illustrative of the scope of this invention.

*Example I*

A 15.9 g. (0.1 mol) portion of pyridine-sulfur trioxide complex was slurried in 100 ml. of ethylene dichloride. A 3.0 g. (0.1 mol) portion of paraformaldehyde was added to the slurry, the mixture was refluxed on a hot-water bath for 9 hours, and then was maintained overnight at room temperature. The resulting reaction mixture was filtered and a solid, white precipitate was recovered. The precipitate was dried at room temperature, weighed (18.6 g.), and recrystallized from water. The resulting, purified solid, which was in the form of white needles, had a melting point of 221° C. and evolved gas at 225° C. This product was identical with the betaine, 1-sulfato-1-pyridinium betaine, of the Baker and Field reference by melting point and infrared analysis. Baker and Field reported a melting point of 228° C. with gas evolution. This product was analyzed for proportions of the various elements therein and comparison of the theoretical and determined elemental analyses was as follows:

Theoretical: C, 41.6%; H, 4.1%; N, 8.1%; S, 18.5%.
Found: C, 39.2%; H, 4.1%; N, 7.2%; S, 17.5%.

From the experiments which were carried out, the reaction occurred as follows:

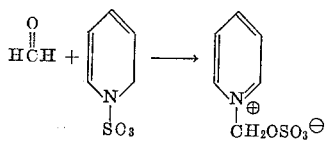

This structure has been evidenced by (1) the elemental analyses for carbon, hydrogen, nitrogen, and sulfur, (2) the high melting point, characteristic of an internal salt zwitter-ion (which corresponds to the reported value in the literature), (3) solubility in water and organic solvents, (4) the absence of a precipitate with barium chloride solution unless heated previously with acid, indicating the presence of a C—O—SO$_3$ linkage, (5) the neutrality of aqueous solutions, (6) the infrared analysis indicating the presence of the proper functional groups, and (7) direct comparison of the product with the betaine prepared by the method of Baker and Field.

*Example II*

A 0.2 mol. portion of quinoline-sulfur trioxide complex is suspended in 100 ml. of hexane, and a 0.2 mol. portion of paraformaldehyde added thereto. The mixture is refluxed for 8 hours and then maintained overnight at room temperature. The precipitate which forms is recovered by filtration, dried, and recrystallized from water. The crystalline product which is obtained has a high melting point, characteristic of betaine compounds, is neutral in aqueous solution, and gives a negative barium chloride test except when heated previously with acid. The product which is produced in this reaction is 1-sulfato-1-quinoline betaine.

*Example III*

A 0.2 mol. portion of acridine-sulfur trioxide complex is suspended in 100 ml. of hexane, and a 0.2 mol. portion of paraformaldehyde added thereto. The mixture is refluxed for 8 hours and then maintained overnight at room temperature. The precipitate which forms is recovered by filtration, dried, and recrystallized from water. The crystalline product which is obtained has a high melting point, characteristic of betaine compounds, is neutral in aqueous solution, and gives a negative barium chloride test except when heated previously with acid. The product which is produced in this reaction is 1-sulfato-1-acridine betaine.

*Example IV*

A 0.2 mol. portion of trimethyl amine-sulfur trioxide complex is suspended in 100 ml. of carbon tetrachloride, and a 0.2 mol. portion of paraformaldehyde added thereto. The mixture is refluxed for 8 hours and then maintained overnight at room temperature. The precipitate which forms is recovered by filtration, dried, and recrystallized from water. The crystalline product which is obtained has a high melting point, characteristic of betaine compounds, is neutral in aqueous solution, and gives a negative barium chloride test except when heated previously with acid. The product which is produced in this reaction is 1-sulfato-1-trimethyl betaine.

*Example V*

A 0.2 mol. portion of dimethyl aniline-sulfur trioxide complex is suspended in 100 ml. of toluene, and a 0.2 mol. portion of paraformaldehyde added thereto. The mixture is refluxed for 8 hours and then maintained overnight at room temperature. The precipitate which forms is recovered by filtration, dried, and recrystallized from water. The crystalline product which is obtained has a high melting point, characteristic of betaine compounds, is neutral in aqueous solution, and gives a negative barium chloride test except when heated previously with acid. The product which is produced in this reaction is 1-sulfato-1-dimethylaniline betaine.

*Example VI*

A 15.6 g. portion (0.1 mol) of 4,4'-bipyridyl in 200 ml. ethylene chloride is treated dropwise with cooling at 0° C. and agitation with 16.0 g. (0.2 mol) sulfur trioxide. The resulting reaction mixture is then treated with 6.0 g. paraformaldehyde and the mixture is refluxed for 3 hours. The reaction mixture is filtered to obtain the solid product which is then washed with ethylene chloride. The product, which is soluble in alcohol, has the formula:

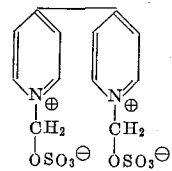

*Example VII*

A solution of 4.4 g. (0.033 mol) paraldehyde in 100 ml. of ethylene chloride was treated with 15.9 g. (0.1 mol) sulfur trioxide-pyridine complex. The mixture was refluxed for 1 hour to obtain a solid product which was then filtered, washed with ethylene chloride and dried. The product, which was obtained in a yield of 16.2 grams, had a melting point of 120–130° C. Two recrystallizations from aqueous formula 30 alcohol gave 1-methyl-1-pyridinium-1-sulfato betaine as white crystals having a melting point of 148–152° C. Aqueous solutions of the salt were neutral and gave negative tests for sulfate amine unless hydrolyzed with hydrochloric acid.

Analysis for $C_7H_9O_4NS$.—Calculated: C, 41.37%; H, 4.42%; N, 6.89%; S, 15.78%. Found: C, 41.49%; H, 4.33%; N, 6.9%; S, 15.9%.

*Example VIII*

25 ml. of ethylene chloride containing 1.2 g. of free formaldehyde in solution was treated with 5.8 g. of sulfur trioxide-pyridine complex. The container was sealed while in a Dry Ice-acetone bath. The sealed container was then slowly heated to 70° C. and then maintained at 70–85° C. for three hours with occasional stirring. The sealed container was then cooled, opened, and the insoluble product which formed was filtered, washed with 20 ml. of ether and dried in an evacuated desiccator. Recrystallization of the product from aqueous formula 30 alcohol yielded 1.8 g. of the same betaine prepared from the paraformaldehyde in Example VII.

*Example IX*

7.2 g. of para n-butyraldehyde was added to a slurry of 15.9 g. of sulfur trioxide-pyridine complex in 100 ml. of ethylene dichloride. This mixture was stirred mechanically for 6 hours at room temperature, allowed to stand for 16 hours at room temperature, and then stirred again for 2 hours at room temperature. The solution turned from clear to amber to a brownish color during the time allowed for the reaction. The insoluble product was filtered, washed with 20 ml. of ethylene dichloride, and dried in an evacuated desiccator. The crude product was recrystallized from water giving 1-propyl-1 pyridinium-1-sulfato betaine, melting at 131–133° C. with gas evolution. Aqueous solutions of the product were neutral and gave no precipitate with barium chloride solution unless hydrolyzed with hydrochloric acid.

Analysis for $C_9H_{13}O_4NS$.—Calculated: C, 46.7%; H, 5.66%; N, 6.06%; S, 13.87%. Found: C, 46.7%; H, 6.02%; N, 6.16%; S, 14.02%.

Example X

To a slurry of 15.9 g. (0.1 mol) of sulfur trioxide-pyridine complex and 100 ml. of ethylene dichloride was added 7.2 g. normal butyraldehyde. This mixture was stirred at room temperature for 6 hours and then kept at room temperature for 16 hours to form a precipitate. The insoluble product was filtered, washed with 25 ml. of ethylene dichloride and dried in an evacuated desiccator. Crude yield of product was 62% of the theoretical yield. The crude product was soluble in water and recrystallization from water gave 1-propyl-1-pyridinium-1 sulfato betaine, melting at 134–136° C. This product was identical with the product prepared from para n-butyraldehyde (Example IX).

Example XI

To a solution of 7.2 g. (0.1 mol) of isobutyraldehyde in 100 ml. of ethylene dichloride, 15.9 g. (0.1 mol) of sulfur trioxide-pyridine complex was added. The solution was kept at 40–50° C. for 2 hours with mechanical stirring to obtain a solid product. The solid product was filtered, washed with 20 ml. of ethylene dichloride, and dried in an evacuated desiccator. Yield of this crude product was 13.4 grams. The crude product was recrystallized from water to give 1-isopropyl-1-pyridinium-1 sulfato betaine, which was in the form of small fluffy, white crystals having a melting point of 139–140° C. Aqueous solutions of the product gave a negative sulfate test unless hydrolyzed with hydrochloric acid.

Analysis for $C_9H_{13}O_4NS$.—Calculated: C, 46.7%; H, 5.7%; N, 6.1%; S, 13.9%. Found: C, 47.4%; H, 5.8%; N, 6.3%; S, 14.0%.

Example XII

A slurry of 100 ml. of ethylene dichloride, 15.9 g. (0.1 mol) of sulfur trioxide-pyridine complex, and 14.7 g. (0.1 mol) of trichloroacetaldehyde was kept at room temperature with occasional agitation for about 14 hours. The solid product which formed in a yield of 15.5 grams was then filtered, washed with 40 ml. of ethylene dichloride and dried. Recrystallization from water gave the pure product as white needles having a melting point of 164–165° C. Aqueous solutions of the product were neutral and gave negative sulfate tests until hydrolyzed with hydrochloric acid. The infrared spectrum was also in accord with the betaine structure.

Analysis for $C_7H_6O_4NSCl_3$.—Calculated: C, 27.4%; H, 1.97%; N, 4.6%; S, 10.5%; Cl, 34.7%. Found: C, 27.4%; H, 2.05%; N, 4.6%; S, 10.5%; Cl, 34.8%.

Example XIII

A slurry of 100 ml. of ethylene dichloride, 15.9 g. (0.1 mol) of sulfur trioxide-pyridine complex, and 8.6 g. (0.1 mol) of trimethylacetaldehyde was kept at room temperature with occasional agitation for 24 hours. The solid reaction product (18.6 grams) was then filtered, washed with 30 ml. of ethylene dichloride, and dried. Recrystallization from methanol gave the pure betaine as white granular crystals having a melting point of 152–153° C. Aqueous solutions of the product were neutral and gave negative sulfate tests until hydrolyzed with hydrochloric acid. The infrared spectrum was as expected for the betaine structure.

Analysis for $C_{10}H_{15}O_4NS$.—Calculated: C, 49.0%; H, 6.16%; N, 5.8%; S, 13.1%. Found: C, 49.1%; H, 6.15%; N, 5.8%; S, 13.1%.

Examples of other heterocyclic tertiary amine complexes and aldehydes which can be reacted and the solid products which are obtained are shown in Table I.

TABLE I

| Sulfur Trioxide Complex | Aldehyde | Solvent | Product |
|---|---|---|---|
| (bipyridine bis-SO₃ complex) | HCHO | n-Heptane | (bis-pyridinium methylene disulfate) |
| (quinoline bis-SO₃ complex) | CH₃CHO | Ethylene dichloride | (bis-quinolinium ethylidene disulfate) |
| (terpyridine tris-SO₃ complex) | HCHO | Ethylene dichloride | (tris-pyridinium methylene trisulfate) |

The embodiments of the invention in which an exclusive property or privilege is claimed are defined as follows:

1. A betaine comprising:

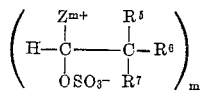

where $R^5$, $R^6$ and $R^7$ are radicals of the group consisting of: hydrogen, and $C_1$–$C_4$ alkyl; and Z is selected from group consisting of: pyridine, quinoline, acridine and aniline; and $m$ is an integer from 1 to 3.

2. A betaine in accordance with claim 1 in which said polyheterocyclic aromatic tertiary amine is only of fused ring structure.

3. A betaine in accordance with claim 1 in which said polyheterocyclic aromatic tertiary amine is of separated ring structure.

4. A method of preparing betaines which comprises reacting an aldehyde of the group consisting of formaldehyde and aldehydes of the formula

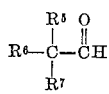

wherein $R^5$, $R^6$ and $R^7$ are of the group consisting of hydrogen, and $C_1$–$C_{30}$ alkyl, aryl, aralkyl, alkaryl, cycloalkyl, alkoxy, thioalkoxy, acetoxy, cycloalkyl radicals formed by joining two of the radicals $R^5$, $R^6$ and $R^7$ with an alkylene group, substituents from the group consisting of halo, nitro, amino, mercapto, and radicals of said group containing said substituents, sulfo carboxy, with a sulfur trioxide complex of an amine of the group consisting of heterocyclic tertiary amines and tertiary amines of the formula $R^2R^3R^4N$, wherein $R^2$, $R^3$ and $R^4$ are radicals of the group consisting of $C_1$–$C_{30}$ alkyl, aryl, aralkyl, alkaryl, and cycloalkyl.

5. A method in accordance with claim 4 in which said amine is a heterocyclic tertiary amine.

6. A method in accordance with claim 5 in which said heterocyclic tertiary amine is a heterocyclic aromatic tertiary amine having at least one tertiary nitrogen atom substituted for a $\equiv$C—H group in an aromatic ring.

7. A method in accordance with claim 6 in which said amine is pyridine.

8. A method in accordance with claim 4 in which said heterocyclic tertiary amine is a polyheterocyclic tertiary amine.

9. A method in accordance with claim 8 in which said polyheterocyclic aromatic tertiary amine is of separated ring structure.

10. A method of preparing betaines which comprises reacting a polyheterocyclic aromatic tertiary amine with a complex of sulfur trioxide with an aldehyde of the group consisting of formaldehyde and aldehydes of the formula

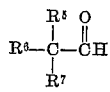

wherein $R^5$, $R^6$ and $R^7$ are of the group consisting of hydrogen, and $C_1$–$C_{30}$ alkyl, aryl, aralkyl, alkaryl, cycloalkyl, alkoxy, thioalkoxy, acetoxy, cycloalkyl radicals formed by joining two of the radicals $R^5$, $R^6$ and $R^7$ with an alkylene group, substituents from the group consisting of halo, nitro, amino, mercapto, sulfo carboxy, and radicals of said group containing said substituents.

11. A betaine in accordance with claim 4 which is the reaction product of pyridine, trichloroacetaldehyde and sulfur trioxide.

12. A method in accordance with claim 7 in which $R^5$, $R^6$, and $R^7$ are chlorine.

13. The betaine of claim 1 in which the

group is

14. A betaine comprising:

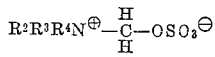

where $R^2$, $R^3$, and $R^4$ are radicals of the group consisting of $C_1$–$C_{30}$ alkyl, cycloalkyl, aryl, aralkyl and alkaryl.

15. A betaine in accordance with claim 1 in which Z is a polyheterocyclic aromatic tertiary amine having only one tertiary nitrogen atom substituted for a $\equiv$C—H group in at least two aromatic rings.

16. A betaine comprising:

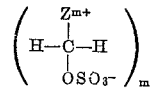

where $m$ is 2 or 3 and Z is a heterocyclic tertiary amine selected from the group consisting of: pyridine, quinoline, acridine and aniline.

17. The betaine:

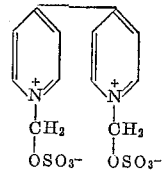

18. A betaine comprising:

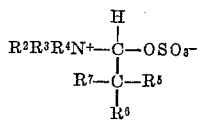

where $R^2$, $R^3$, $R^4$, $R^5$, $R^6$ and $R^7$ are radicals selected from the group consisting of: hydrogen, $C_1$–$C_4$ alkyl.

References Cited by the Examiner

UNITED STATES PATENTS 3,225,073  10/1961  Glabisch et al. _____ 260—401
3,131,189   4/1964  Klass _____ 260—294.8

OTHER REFERENCES

Baker et al.: Chem Soc. Journal, London, 1932, part I, page 88.

WALTER A. MODANCE, *Primary Examiner.*

ALAN L. ROTMAN, *Assistant Examiner.*